June 5, 1928.

F. TYSON 1,672,012

ROLLER BEARING

Filed June 19, 1925

Inventor
Frank Tyson
By Frease and Bond Attorneys

Patented June 5, 1928.

1,672,012

UNITED STATES PATENT OFFICE.

FRANK TYSON, OF CANTON, OHIO.

ROLLER BEARING.

Application filed June 19, 1925. Serial No. 38,215.

This invention relates to roller bearings such as are used in motor vehicles, agricultural implements and the like, and more particularly to taper roller bearings provided with a cone upon which the tapered rollers operate, a conical cup surrounding said rollers.

In roller bearings of this character, such as are now in general use, it has been found that the ends of the rollers wear more rapidly than the central portions thereof, soon producing a high point at the central portion of each roller causing the rollers to pivot upon the same when the bearing is rotating, producing a chattering of the bearing.

The object of the present invention is to overcome this difficulty by providing resilient cups and cones for the bearings and by relieving the central portion of each roller either by reducing the same in diameter, as modified from general practice, or by stamping or pressing each roller from a sheet of steel, having an integral head at one end and an inserted head at the other end, either of these forms of rollers, co-acting with the resilient cup and cone which may also be stamped from sheets of steel, preventing the formation of a high spot at the center of each roller and thus eliminating the trouble above mentioned. It is also an object of this invention to eliminate the usual cage commonly provided for spacing the rollers, thus eliminating the friction which ordinarily accompanies the use of such a cage.

Figure 2:
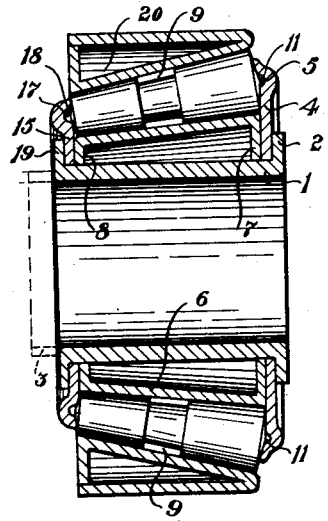
Figure 1:
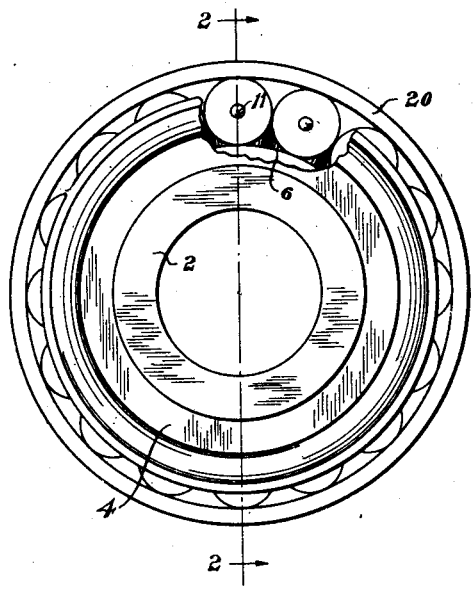
Figure 3:
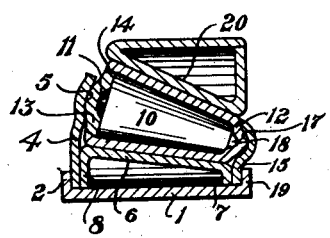
Figure 4:

An embodiment of the invention is illustrated in the accompanying drawing, in which, Figure 1 is an end elevation of the improved bearing, a portion being broken away for the purpose of illustration;

Fig. 2, a section on the line 2—2, Fig. 1;

Fig. 3, a fragmentary section of a slightly modified form of the bearing;

Fig. 4, a detail perspective view of the form of roller shown in Fig. 2, and

Figure 5:
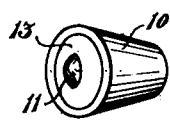

Fig. 5, a similar view of the roller shown in Fig. 3.

Similar numerals indicate corresponding parts throughout the drawing.

Referring more particularly to the construction illustrated in the drawing, a collar or sleeve 1 is placed upon the shaft or axle to which the roller bearing is to be applied, an annular flange 2 being formed at one end thereof, while the other end of said collar is straight as shown in dotted lines at 3 in Fig. 1.

A disc 4, provided near its periphery with an annular groove 5, is then slid upon the sleeve into contact with the annular flange 2 thereon. The cone 6, which may be in the form of a steel stamping having annular flanges 7 and 8 at its larger and smaller ends respectively, is then slipped upon the collar 1, the flange 7 contacting with the disc 4.

The rollers, which may be hollow, stamped rollers provided with the reduced central portion 9 as shown in Figs. 2 and 4 or the hollow stamped rollers 10 as shown in Figs. 3 and 5, are then placed in position around the cone, the pintles 11 at the larger ends of the rollers being received in the annular groove 5 in the disc 4.

It will be seen that no cage is required to properly space the rollers, the pintles and grooves holding the rollers against displacement when the cup, hereinafter described, is removed, the pintles being free to travel around the annular grooves as the rollers rotate around the cone. The friction in the bearing is thus greatly reduced by eliminating the usual cage, and a greater number of rollers may be placed in a bearing of any given size than is possible with the usual form of bearing in which a cage is required.

The rollers 10 shown in Figs. 3 and 5 provide considerable resilience through the central portion of the roller as the same is stamped or pressed from a sheet of steel having the integral head 12 at its smaller end and the inserted head 13 at its larger end, and retained in the roller by upsetting the edge portion of the roller proper over the peripheral portion of the inserted disc head as shown at 14.

A disc 15, provided with an annular groove 17 around its peripheral portion, is then slipped upon the collar 1, contacting with the flange 8 upon the cone, the pintles 18 upon the smaller ends of the rollers being received in said annular groove 17. The end of the collar designated at 3 in Fig. 2, is then formed into an annular flange 19 retaining the cone, rollers and discs in an assembly upon the collar.

The cup 20 which may be formed of a steel stamping, is than placed over the rollers and the bearing is ready for use. It will be obvious that considerable resilience is provided by the hollow stamped cup and cone co-operating with the rollers which are relieved at their central portions either by reducing their diameters at this point or by forming the rollers of steel stampings, thus preventing high points from being formed at the central portions of the rollers and eliminating the difficulties caused from this defect, as above pointed out. It will also be seen that the form of roller bearing herein disclosed eliminates the friction usually accompanying the cage, and provides for a roller bearing of any given size having a greater number of rollers than is possible with the cage type of bearing.

It will be seen that this construction of hollow cone and cup, between which the rollers are interposed, provides the point of greatest resilience intermediate the ends of all of these parts, thus obviating the difficulty above mentioned of the formation of high points between the ends of the rollers.

It should be understood that the invention may be embodied in a variety of mechanical forms, one of which I have chosen to illustrate in the above description and the accompanying drawing.

I claim:

1. For a roller bearing, a hollow roller formed of a single piece of metal and having an integral head at one end and an inserted head at its other end to receive the radial thrust of the bearing.

2. For a roller bearing, a tapered hollow roller formed of a single piece of metal and having an integral head at its small end and an inserted head at its large end to receive the radial thrust of the bearing.

In testimony that I claim the above, I have hereunto subscribed my name.

FRANK TYSON.